(12) United States Patent
Amano

(10) Patent No.: US 6,241,318 B1
(45) Date of Patent: Jun. 5, 2001

(54) SEAT-BACK FRAME

(75) Inventor: Akira Amano, Yokohama (JP)

(73) Assignee: Ikeda Bussan Co., Ltd., Ayase (JP)

( * ) Notice: Subject to any disclaimer, the term of this patent is extended or adjusted under 35 U.S.C. 154(b) by 0 days.

(21) Appl. No.: 09/577,014

(22) Filed: May 24, 2000

(30) Foreign Application Priority Data

May 31, 1999 (JP) .................................................. 11-151192

(51) Int. Cl.[7] ...................................................... A47C 7/02
(52) U.S. Cl. ........................................................ 297/452.2
(58) Field of Search ............................. 297/452.18, 452.2

(56) References Cited

U.S. PATENT DOCUMENTS

| 5,328,248 | * | 7/1994 | Nishiyama . |
| 5,636,901 | * | 6/1997 | Grilliot et al. . |
| 5,645,316 | * | 7/1997 | Aufrere et al. . |
| 5,685,614 | * | 11/1997 | Chabanne . |
| 5,769,499 | * | 6/1998 | Dudash et al. . |
| 6,048,033 | * | 4/2000 | Sakurai et al. . |

FOREIGN PATENT DOCUMENTS 6-334565 * 12/1994 (JP) .................................. H04B/1/59

* cited by examiner

*Primary Examiner*—Milton Nelson, Jr.
(74) *Attorney, Agent, or Firm*—Foley & Lardner

(57) ABSTRACT

A seat-back frame includes side-frame portions having sides formed with recesses, an upper-frame portion arranged between upper ends of the side-frame portions, a lower-frame portion arranged between lower ends of the side-frame portions, and a crosspiece arranged between the side-frame portions and having ends engaged with the recesses of the side-frame portions.

8 Claims, 3 Drawing Sheets

SEAT-BACK FRAME

BACKGROUND OF THE INVENTION

The present invention relates to a seat-back frame, and more particularly, to a seat-back frame including an upper-frame portion, two side-frame portions, a lower-frame portion, and a crosspiece arranged between the side-frame portions and having substantially a rectangular shape.

Conventionally, vehicle seat backs include a substantially rectangular pipe frame or panel frame, which is obtained by bending a pipe or a panel. In the case of the pipe frame, a spring member such as an S-shaped spring is arranged with the pipe frame, which is covered with a pad and a skin. Moreover, a hinge such as an armrest, a reclining device, etc. are fixed to the pipe frame by means of welding or the like.

The seat-back frame includes an upper-frame portion and two side-frame portions, having substantially an inverted-U shape. A lower-frame portion is arranged between lower ends of the side-frame portions. A one-side locking mechanism of the reclining device, etc. are mounted to the lower end of the side-frame portion. In view of an impact load that may be applied to the seat back in the lateral or longitudinal direction in the event of side or rear crash, the seat-back frame needs to have certain static and torsional rigidities. Thus, a reinforcing crosspiece is arranged between the side-frame portions.

However, the seat-back frame including a substantially rectangular pipe frame is excellent in static rigidity, but poor in impact absorption. On the other hand, the seat-back frame including a panel frame is poor in crash strength, since the side-frame portions may largely be deformed in the event of rear or side crash, i.e. they have greater deformation for impact absorption.

Moreover, the seat-back frame including a crosspiece is improved in rigidity, but complicated in assemblage, which increases manufacturing cost, resulting in poor cost efficiency. If the crosspiece is arranged adjacent to the lower-frame portion, the seat-back frame is excellent in static rigidity, but poor in torsional rigidity in the event of rear or side crash. On the other hand, if the crosspiece is arranged too away from the lower-frame portion, the seat-back frame is poor in both static and torsional rigidities.

It is, therefore, an object of the present invention to provide a seat-back frame that is excellent not only in static and torsional rigidities, but in cost efficiency.

SUMMARY OF THE INVENTION

One aspect of the present invention lies in providing a seat-back frame, comprising:
 side portions having upper and lower ends, said side portions having sides formed with recesses;
 an upper portion arranged between said upper ends of said side portions;
 a lower portion arranged between said lower ends of said side portions; and
 a cross portion arranged between said side portions, said cross portion having ends engaged with said recesses of said side portions.

Another aspect of the present invention lies in providing a seat-back frame, comprising:
 side portions having upper and lower ends, said side portions being formed with upper and lower recesses;
 an upper portion arranged between said upper ends of said side portions;
 a lower portion arranged between said lower ends of said side portions; and
 upper and lower cross portions, each cross portion being arranged between said side portions, said upper cross portion having ends engaged with said upper recesses of said side portions, said lower cross portion having ends engaged with said lower recesses of said side portions.

DETAILED DESCRIPTION OF THE INVENTION

Figure 1A:
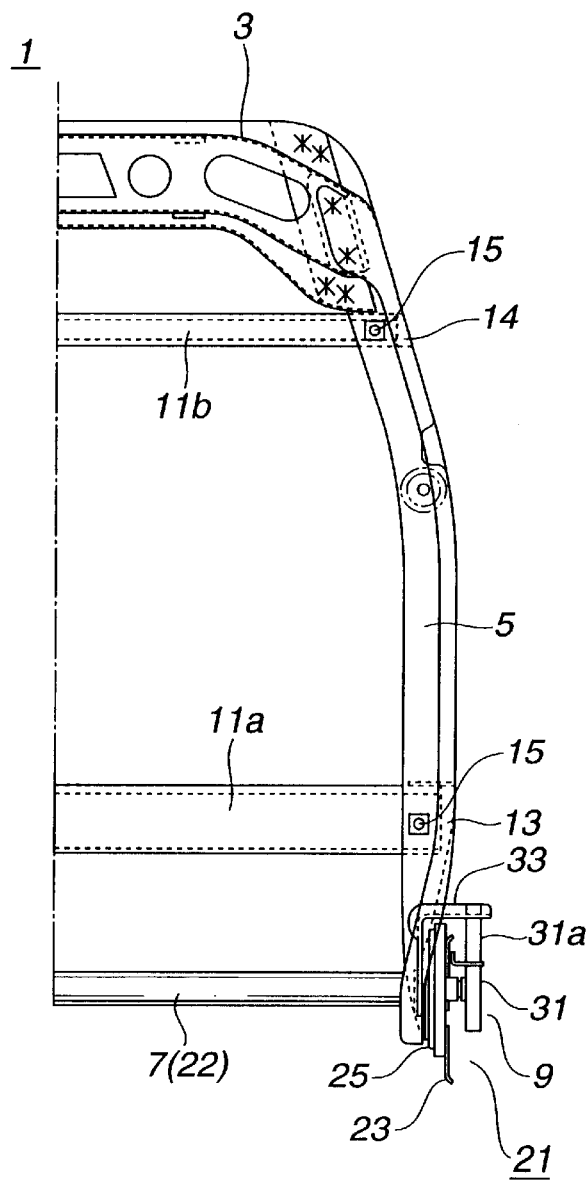
FIG. 1A is a fragmentary front view showing a seat-back frame embodying the present invention.

Referring to the drawings, a description will be made with regard to a seat-back frame embodying the present invention.

Figure 1B:
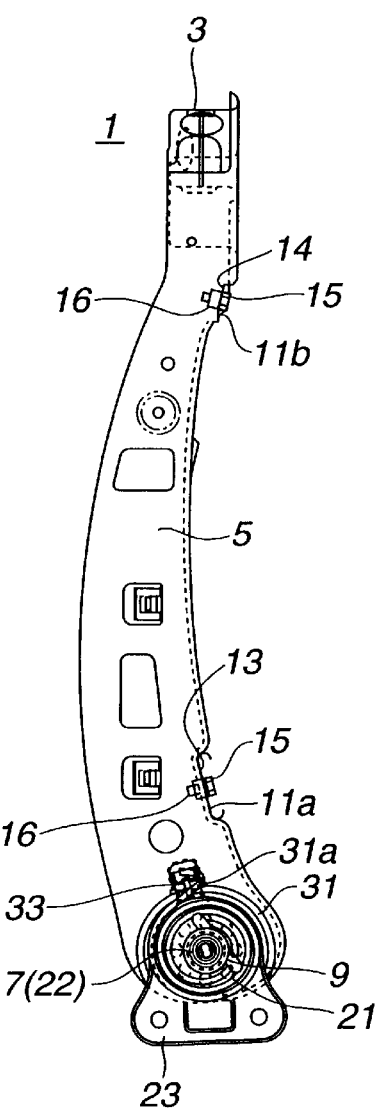
FIG. 1B is a side view showing the seat-back frame.

Referring to FIGS. 1A–1B, a seat-back frame 1 includes an upper-frame portion 3, two side-frame portions 5 (one of which is seen), and a lower-frame portion 7, having substantially a rectangular shape.

Figure 3:
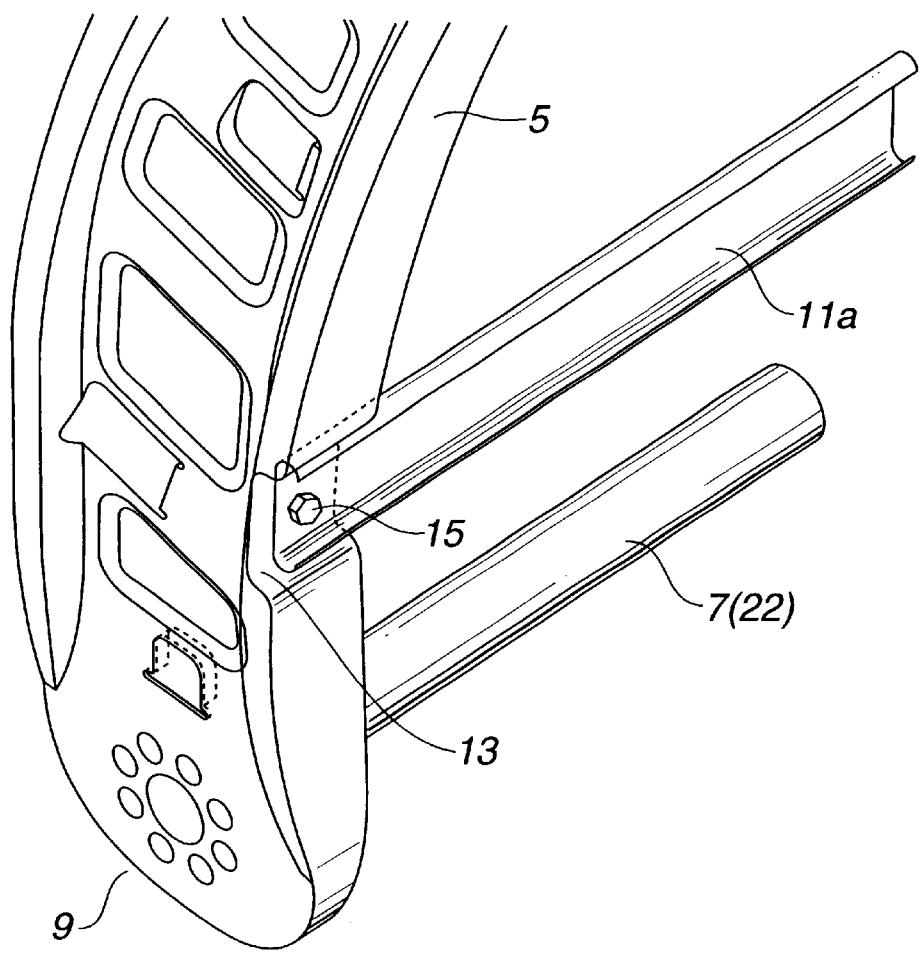
FIG. 3 is an enlarged fragmentary perspective view showing the lower part of the seat-back frame.

Moreover, the seat-back frame 1 includes a lower crosspiece 11a and an upper crosspiece 11b, each being arranged between the side-frame portions 5. Referring also to FIG. 3, the lower and upper crosspieces 11a, 11b have upper and lower ends bent to face each other, having substantially an U-shaped section.

Figure 2:
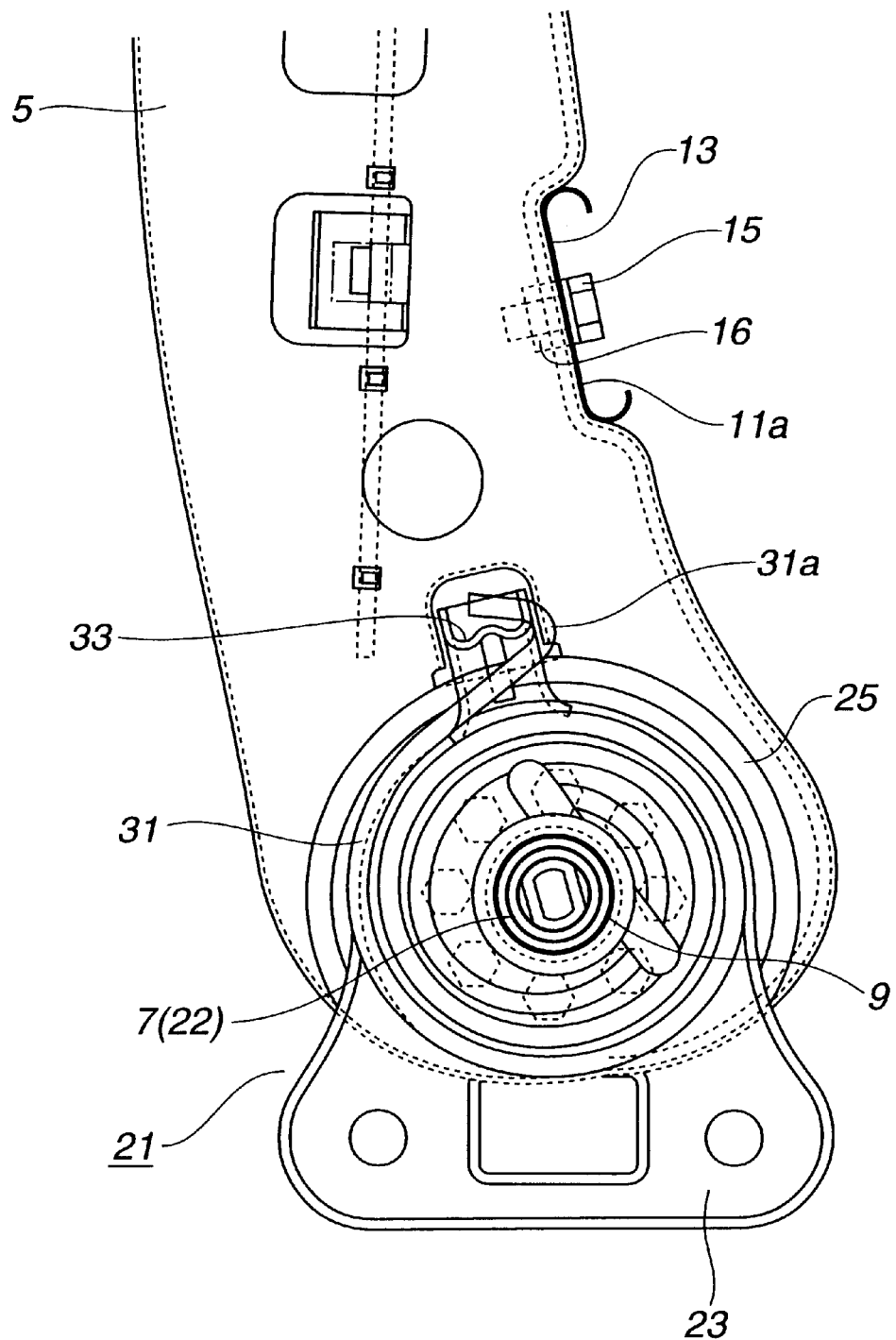
FIG. 2 is an enlarged fragmentary side view showing a lower part of the seat-back frame.

The upper-frame portion 3 and the side-frame portions 5 are integrally formed out of a panel frame, having substantially an inverted-U shape. Referring to FIGS. 2–3, a recess 13 is formed in each side-frame portion 5 at one lower side. An end of the lower crosspiece 11a is engaged with the recess 13, which is fixed by means of a bolt 15 and a nut 16. Likewise, an end of the upper crosspiece 11b is engaged with a recess 14 formed in one upper side of the side-frame portion 5, which is fixed by means of a bolt 15 and a nut 16.

The lower-frame portion 7 is formed out of a pipe frame and is arranged between lower ends of the side-frame portions 5. One end of the lower-frame portion 7 is formed with a pivot shaft 22 of a one-side locking mechanism 9 of a reclining device 21. The reclining device 21 includes a base 23 and an arm 25. The seat-back frame 1 is fixed to the arm 25 by means of bolting, welding or the like.

As best seen in FIG. 2, the reclining device 21 includes a return spring 31 that has one outside end 31a engaged with an engagement 33 formed in a lower part of the side-frame portion 5.

The distance between the lower-frame portion 7 and the lower crosspiece 11a is, preferably, about one-third the distance between the lower-frame portion 7 and the upper-frame portion 3, e.g. about 140 mm. Such distance allows a reduction in the displacement of the seat-back frame 1 when undergoing transverse and rear loads, resulting in improvement in lateral and longitudinal rigidities. If the distance between the lower-frame portion 7 and the lower crosspiece 11a is smaller than one-third the distance between the lower-frame portion 7 and the upper-frame portion 3, the seat-back frame 1 is poor in torsional rigidity. On the other hand, if it is greater than one-third, the seat-back frame 1 has less rigidity.

Having described the present invention with regard to the preferred embodiment, it is noted that the present invention is not limited thereto, and various changes and modifications can be made without departing from the scope of the present invention. By way of example, in the embodiment, the lower-frame portion 7 is formed out of a pipe frame. Alternatively, it may be formed out of a frame of other type. Moreover, both ends of the lower-frame portion 7 may be formed with the pivot shaft 22 of a both-side locking mechanism 9 of the reclining device 21.

The entire contents of Japanese Patent Application P11-151192 are incorporated herein by reference.

What is claimed is:

1. A seat-back frame, comprising:

side portions having upper and lower ends, said side portions having sides formed with recesses;

an upper portion arranged between said upper ends of said side portions;

a lower portion arranged between said lower ends of said side portions; and a cross portion arranged between said side portions, said cross portion having ends engaged with said recesses of said side portions, wherein a distance between said lower portion and said cross portion is about one-third a distance between said upper portion and said lower portion, said distance being 146 mm.

2. The seat-back frame as claimed in claim 1, wherein said side portions and said upper portion are integrally formed out of a panel frame.

3. The seat-back frame as claimed in claim 1, wherein said lower portion includes a pipe frame.

4. The seat-back frame as claimed in claim 1, wherein said cross portion has upper and lower ends bent to face each other, said cross portion having substantially an U-shaped section.

5. A seat-back frame, comprising:

side portions having upper and lower ends, said side portions being formed with upper and lower recesses;

an upper portion arranged between said upper ends of said side portions;

a lower portion arranged between said lower ends of said side portions; and upper and lower cross portions, each cross portion being arranged between said side portions, said upper cross portion having ends engaged with said upper recesses of said side portions, said lower cross portion having ends engaged with said lower recesses of said side portions, wherein a distance between said lower portion and said lower cross portion is about one-third a distance between said upper portion and said lower portion, said distance being 140 mm.

6. The seat-back frame as claimed in claim 5, wherein each cross portion has upper and lower ends bent to face each other, each cross portion having substantially an U-shaped section.

7. The seat-back frame as claimed in claim 5, wherein said lower portion includes a pipe frame.

8. The seat-back frame as claimed in claim 5, wherein said side portions and said upper portion are integrally formed out of a panel frame.

\* \* \* \* \*